(12) United States Patent
Pierre et al.

(10) Patent No.: US 10,424,208 B2
(45) Date of Patent: Sep. 24, 2019

(54) NAVIGATIONAL AID METHOD DEPENDING ON METEOROLOGICAL CONDITIONS

(71) Applicant: THALES, Courbevoie (FR)

(72) Inventors: Christophe Pierre, Fontenilles (FR); Rémy Auletto, Toulouse (FR); Benoît Dacre-Wright, Lauzerville (FR)

(73) Assignee: THALES, Courbevoie (FR)

( * ) Notice: Subject to any disclaimer, the term of this patent is extended or adjusted under 35 U.S.C. 154(b) by 811 days.

(21) Appl. No.: 14/991,704

(22) Filed: Jan. 8, 2016

(65) Prior Publication Data
US 2016/0210866 A1 Jul. 21, 2016

(30) Foreign Application Priority Data

Jan. 16, 2015 (FR) ..................... 15 00091

(51) Int. Cl.
G08G 5/00 (2006.01)
G01C 21/00 (2006.01)
G01C 21/20 (2006.01)
G01C 23/00 (2006.01)
G01W 1/00 (2006.01)

(52) U.S. Cl.
CPC .......... *G08G 5/0039* (2013.01); *G01C 21/00* (2013.01); *G01C 21/20* (2013.01); *G01C 23/00* (2013.01); *G01W 1/00* (2013.01)

(58) Field of Classification Search
CPC ........ G01C 21/20; G01C 21/00; G01C 23/00; G01C 21/005; G01C 21/165; G01C 21/3415; G01C 21/3453; G01C 21/3461; G01C 23/005; G08G 5/0039; G08G 5/045; G08G 5/0021; G08G 5/0034; G08G 1/096775; G08G 5/0052; G08G 5/0069; G08G 5/0091; G08G 5/025; G05D 1/0202; G05D 1/0204; G05D 1/0816; Y02T 50/84;
(Continued)

(56) References Cited

FOREIGN PATENT DOCUMENTS

| EP | 2 490 199 A2 | 8/2012 |
| FR | 2 939 505 A1 | 6/2010 |

OTHER PUBLICATIONS

Seid H. Pourtakdoust et al., "Optimal trajectory planning for flight through microbust wind shears," Aerospace Science and Technology, vol. 15, No. 7, Nov. 24, 2010, pp. 567-576, XP028304342.

*Primary Examiner* — Hussein Elchanti
*Assistant Examiner* — Paul A Castro
(74) *Attorney, Agent, or Firm* — Baker & Hostetler LLP

(57) ABSTRACT

A navigational aid method of an aircraft, carried out by a flight management system, for comparing a reference trajectory of the aircraft subjected to a wind vector field with a new trajectory between the same starting and end points, respectively, the method comprises: determining the reference trajectory, determining the new trajectory, loading meteorological data, determining a directional surface, delimited by a directional closed curve, consisting of the new trajectory, from the starting point to the end point, closed by the opposite of the reference trajectory from the end point to the starting point, determining a wind curl on the basis of the wind vector field, determining a flow of the wind curl through the surface, a positive value of flow indicating that the new trajectory makes better use of the wind load, a negative value of flow indicating that the new trajectory makes less effective use of the wind load.

10 Claims, 12 Drawing Sheets

(58) Field of Classification Search
CPC .. B60W 2550/402; B60W 50/14; B64C 13/16
See application file for complete search history.

NAVIGATIONAL AID METHOD DEPENDING ON METEOROLOGICAL CONDITIONS

CROSS-REFERENCE TO RELATED APPLICATION

This application claims priority to foreign French patent application No. FR 1500091, filed on Jan. 16, 2015, the disclosure of which is incorporated by reference in its entirety.

FIELD OF THE INVENTION

The invention relates to a navigational aid method for comparing flight trajectories to make optimum use of meteorological conditions. The invention is particularly useful in flight management systems on-board aircraft to help the crew to improve an initial flight trajectory depending on changes in meteorological conditions encountered by the aircraft on its trajectory.

BACKGROUND

Known navigational aid systems have means for calculating trajectories between control points defined in a flight plan which may, for example, be provided by the pilot. The trajectories, calculated at the beginning of the flight and possibly updated during the flight, provide support for aircraft manoeuvres, whether they be decided by the pilot or by an automatic piloting system. In the known prior art, the calculated trajectory is split between a lateral trajectory, typically characterised by control points defined by a latitude and a longitude, and a vertical profile applied to this lateral trajectory to take account of the constraints, for example, of relief or fuel consumption management.

Among navigational aid systems, flight management systems (FMS) are known, a functional architecture of which is shown schematically in FIG. 1. In accordance with the ARINC 702 standard, they notably perform the functions of:

Navigation LOCNAV, 170, to perform the optimum localisation of the aircraft depending on geolocation means (GPS, GALILEO, VHF radio beacons, inertial navigation units, etc.), Flight plan FPLN, 110, to input the geographical elements that make up the skeleton of the route to be followed (departure and arrival procedures, control points, etc.), Navigational database NAVDB, 130, to construct geographical routes and procedures on the basis of data included in the databases (points, beacons, interception or altitude legs, etc.), Performance database PERF DB, 150, containing the aerodynamic and engine parameters of the aircraft, Lateral trajectory TRAJ, 120, to construct a continuous trajectory on the basis of the points of the flight plan, in accordance with aircraft performance and confining constraints, Predictions PRED, 140, to construct an optimised vertical profile on the lateral trajectory, Guidance GUID, 200, to guide the aircraft on its 3D trajectory in the lateral and vertical planes, while optimising speed, Digital data link DATALINK, 180, to communicate with control centres and other aircraft.

On the basis of the flight plan FPLN defined by the pilot, a lateral trajectory is determined according to the geometry between the control points. On the basis of this lateral trajectory, a prediction function PRED defines an optimised vertical profile, taking account of any altitude, speed and time constraints. To do this, the FMS system has performance tables PERFDB which define the modelling of the aerodynamics and engines. The prediction function PRED implements the equations of the aircraft dynamics. These equations are based numerically on values contained in the performance tables to calculate drag, lift and thrust. The speed vector and the aircraft position vector are inferred therefrom through double integration.

Consideration of meteorological conditions and the changes therein adds to the complexity of the calculation of a flight trajectory. FIGS. 2a and 2b show a great circle trajectory 10 between a point A and a point B. The meteorological conditions in the surroundings of the trajectory are shown by means of a mesh $M_W$; the direction and length of the arrows in each node of the mesh illustrating the direction and intensity of the wind vector W in this node. The wind vector is defined according to the 3 dimensions, and FIGS. 2a and 2b show the projection of the wind in the plane xy.

As the wind is not constant over the route, the great circle trajectory 10, the shortest trajectory to link A and B, does not turn out to be the most fuel-economical and/or the fastest. An overall optimisation calculation of the trajectory, such as, for example, dynamic programming, enables the construction of a trajectory 11 to link the points A and the point B in an optimised manner, in terms of fuel consumption and/or time. Such a calculation of an optimised trajectory depending on meteorological conditions requires substantial computing resources and a long calculation time. This calculation can be carried out in a computing station on the ground, but it is relatively unsuitable for use in an on-board flight management system.

Enhancement of the trajectory calculation of FMS on-board flight management systems has been envisaged by proposing means to divert an aircraft from its trajectory on the basis of wind information. The patent document published under reference FR2939505 is thus known from the applicant, said document describing an on-board solution for optimising the lateral trajectory, based on a local modification of the flight plan. The diversion is based on the DIRTO function known to the person skilled in the art and described in the ARINC 702 standard. The trajectory is modified in relation to the initial trajectory by adding a diversion point to replace a series of control points of the flight trajectory. The use of the DIRTO function necessarily restricts the complexity of the representation of the lateral trajectory to be followed. This implementation does not guarantee that an optimum trajectory in terms of fuel consumption and/or time will be obtained.

It therefore remains desirable to have effective navigational aid means for adapting a flight trajectory on-board the aircraft allowing further optimisation of fuel consumption and speed and constructing a trajectory in which the aircraft is, as far as possible, propelled by the wind.

One object of the present invention is to overcome the aforementioned disadvantages by proposing a navigational aid method allowing a new trajectory to be generated on the basis of a reference trajectory, allowing better use to be made of the wind, using fewer computing resources than in the prior art, compatible with an execution by on-board systems such as the FMS flight management system on-board the aircraft.

SUMMARY OF THE INVENTION

The subject-matter of the present invention is a navigational aid method of an aircraft, carried out by a flight management system, for comparing a reference trajectory of the aircraft subjected to a wind vector field with a new trajectory between the same starting point and the same end point respectively, the method including the steps consisting in:

determining the reference trajectory, determining the new trajectory, loading meteorological data including the wind vector field in a zone having predetermined dimensions including the reference trajectory and the new trajectory, determining a directional surface, delimited by a directional closed curve, consisting of the new trajectory, from the starting point to the end point, closed by the opposite of the reference trajectory from the end point to the starting point, determining a wind curl on the basis of the wind vector field for at least wind vector values located in said surface, determining a flow of the wind curl through the surface ($S_\Gamma$).

a positive value of said flow indicating that the new trajectory makes better use of the wind load than the reference trajectory, a negative value of said flow indicating that the new trajectory makes less effective use of the wind load than the reference trajectory.

displaying at least one result originating from the preceding step consisting in determining a flow of the wind curl through the surface.

The display step advantageously includes the display of the sign and/or the value of the determined flow.

The trajectories are advantageously contained in a plane xy and the display step includes the display of a mapping of isovalues of the projection according to an axis z of the wind curl, z been defined in such a way that the reference xyz is orthonormal, the mapping being superimposed on the display of the trajectories.

According to one embodiment, the step of determining the new trajectory is performed by the pilot, the new trajectory been determined on the basis of the visual information originating from the mapping.

The step of determining the new trajectory advantageously consists in a deformation of the reference trajectory performed graphically by the pilot, the system displaying the value of the corresponding flow in real time.

According to a different embodiment, the step of determining the new trajectory is performed by the flight management system, and the steps of determining a directional surface and a curl flow are carried out a plurality of times for a plurality of respective new trajectories, an optimum trajectory being determined from said plurality of new trajectories in such a way that said flow is maximum.

Alternatively, the step of determining the new trajectory is performed by the flight management system, the method according to the invention furthermore including a step of determining a length difference between the two trajectories. The steps of determining a directional surface, a curl flow and a length difference are carried out a plurality of times for a plurality of respective new trajectories, an optimum trajectory being determined, from the plurality of new trajectories, in such a way that a parameter representing a compromise between the length difference and the opposite of the flow is minimum.

The parameter is advantageously a positive-coefficient linear combination of the length difference and of the opposite of the flow.

The reference trajectory is advantageously determined by the flight management system.

BRIEF DESCRIPTION OF THE DRAWINGS

Other characteristics, objects and advantages of the present invention will become evident from a reading of the detailed description that follows and with reference to the attached drawings, given by way of a non-limiting example, in which.

DETAILED DESCRIPTION

The inventors have devised an original navigational aid method for an aircraft, which, on the basis of a reference trajectory Γref between a starting point A and an end point B, subjected to a wind vector field W, allows a new trajectory Γnew to be defined between these two points and compared with the reference trajectory Γref.

In the general case, the trajectories are three-dimensional and time-dependent. In a particular case, the reference trajectory is, for example, a great circle located in a horizontal plane xy.

The aim of the comparison is to determine which of the two trajectories makes best use of the wind in a predefined zone.

The method is intended to be carried out by a computer, preferably a flight management system of the aircraft. It is appropriate to interpret the term "flight management system of the aircraft" as any computer on-board the aircraft, according to one example the FMS as previously described, or, according to a different example, a laptop or tablet computer, such as an electronic flight bag (EFB).

The concept developed by the inventors to carry out this comparison will first be described.

Figure 1:
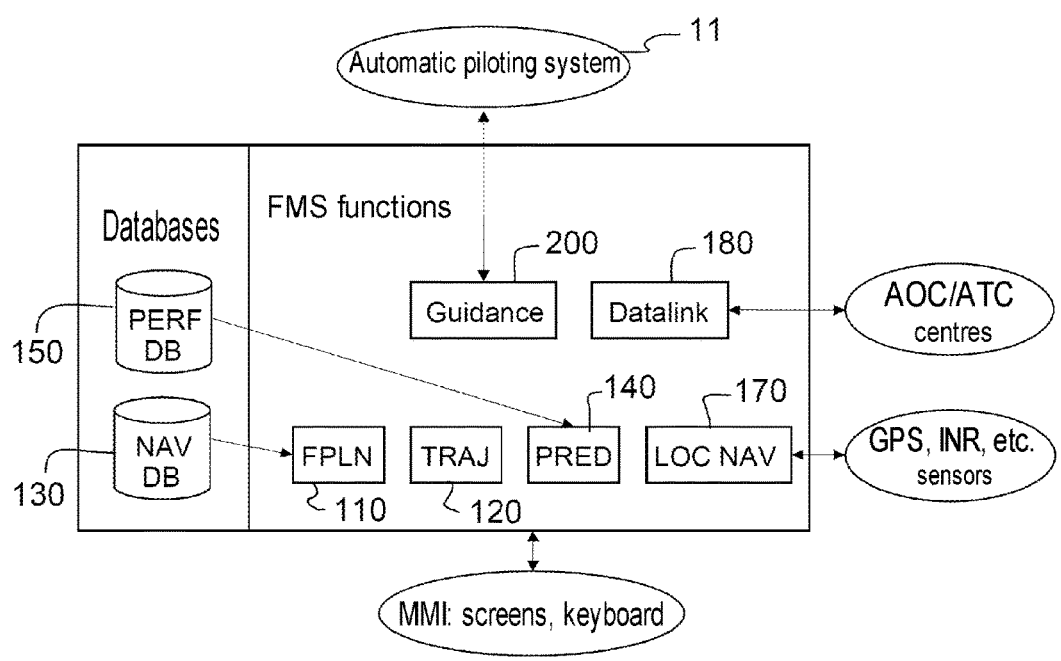
FIG. 1, already presented, shows a known navigational aid system, commonly referred to as FMS, FIGS. 2a and 2b, already presented, show the advantage of considering meteorological conditions for calculating a flight trajectory.
Figure 2A:
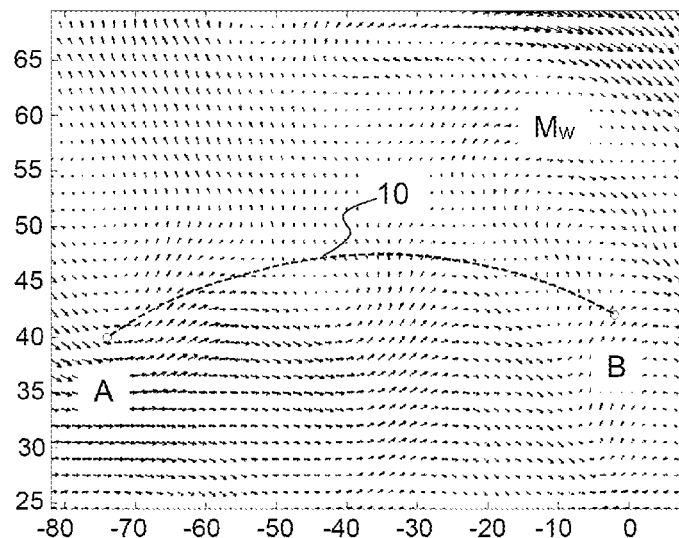
Figure 2B:
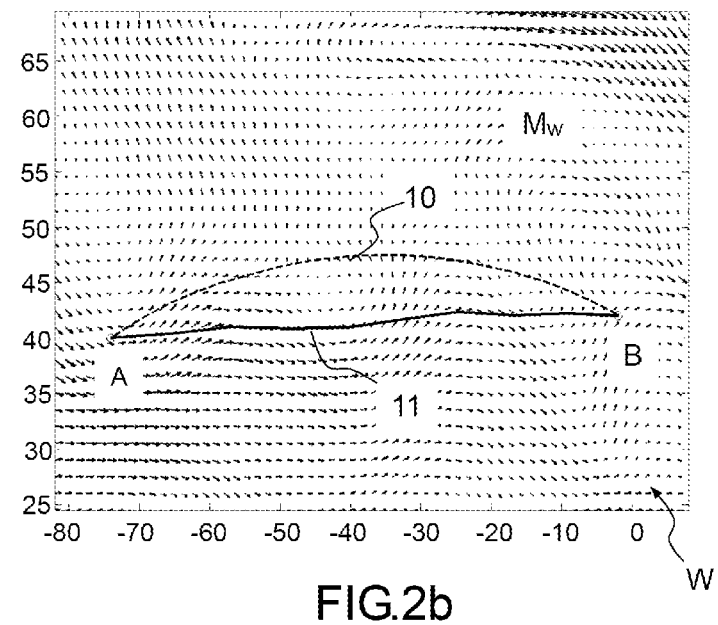
Figure 3:
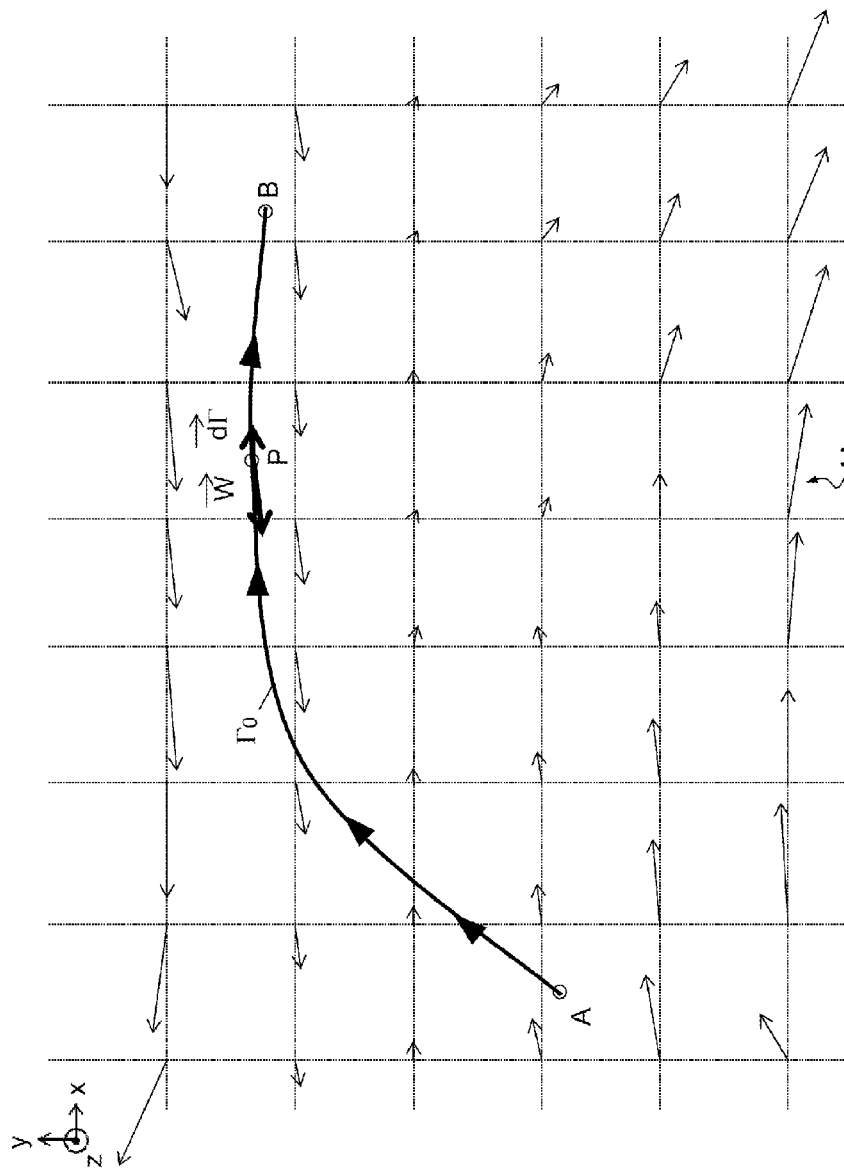
FIG. 3 shows a trajectory Γ0 between a point A and a point B in a wind vector field W, shown in the form of a vector on the nodes of a grid $M_W$.

FIG. 3 shows a trajectory Γ0 between a point A and a point B in a wind vector field W, shown in the form of a grid node vector, as explained above.

The axis z perpendicular to xy is defined such that xyz is an orthonormal reference.

The wind flow $C_{\Gamma 0}$ along the trajectory is defined as the integral of the projection of the wind onto the trajectory expressed below:

$$C_{\Gamma 0} = \int_A^B \vec{W} \cdot \vec{d\Gamma}$$

$\vec{W}$: wind vector $\vec{d\Gamma}$: vector tangent to the trajectory

The flow quantifies the effect of the wind on the trajectory: a high flow value indicates an effective use of the wind. This quantity therefore allows the relative performances of two trajectories to be compared by calculating the difference between the respective flows.

$$C_{\Gamma new} - C_{\Gamma ref} = \int_A^B \vec{W} \cdot \vec{d\Gamma_{new}} - \int_A^B \vec{W} \cdot \vec{d\Gamma_{ref}}$$

A positive value of this difference means that the trajectory $\Gamma_{new}$ makes better use of the wind to propel the aircraft than the trajectory $\Gamma_{ref}$.

The directional closed curve Γ is now assumed to be made up of the new trajectory $\Gamma_{new}$ from A to B closed by the opposite of the reference trajectory—$\Gamma_{ref}$ from B to A.

The flow of the wind $C_\Gamma$ along the closed trajectory Γ corresponds to the flow difference above:

$$C_\Gamma = C_{\Gamma new} - C_{\Gamma ref} = \int_A^B \vec{W} \cdot \vec{d\Gamma_{new}} - \int_A^B \vec{W} \cdot \vec{d\Gamma_{ref}}$$

$$C_\Gamma = \oint_\Gamma \vec{W} \cdot \vec{d\Gamma}$$

Figure 4A:
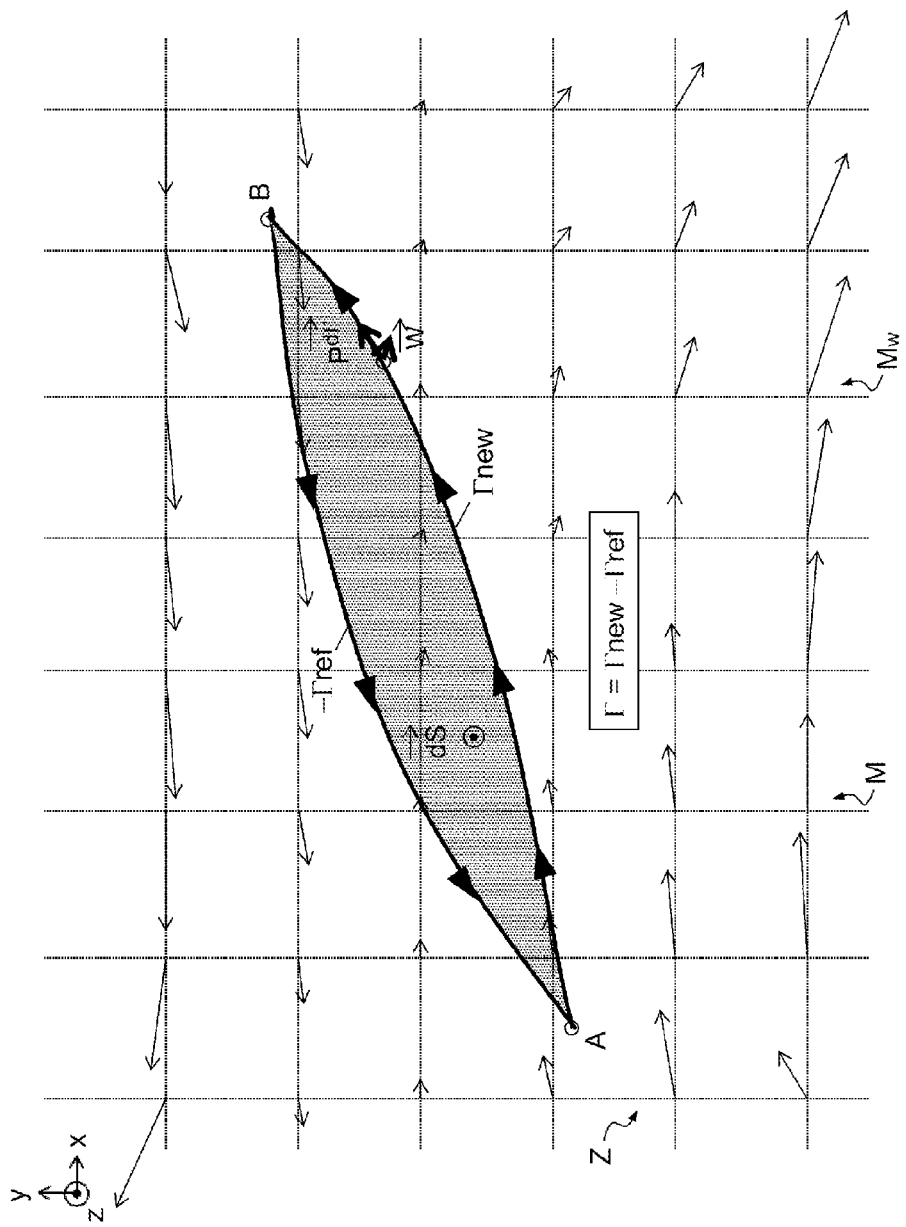
FIGS. 4a and 4b show the application of the Kelvin-Stokes theorem to the closed trajectory.

The application of the Kelvin-Stokes theorem has the following result, as shown in FIG. 4a:

$$C_\Gamma = \oint_\Gamma \vec{W} \cdot \vec{d\Gamma} = \int\int_S \overrightarrow{\nabla \wedge W} \cdot \vec{dS}$$

Where $\vec{dS}$ is the normal vector on the surface contained in the closed outline defined by the two trajectories (according to the direction of the closed outline)

$\overrightarrow{\nabla \wedge W}$ is the wind curl, also referred to as Rot W.

The above formula indicates that the flow of the wind along the closed curve Γ is equal to the flow of the wind curl through the surface delimited by the directional closed curve Γ, i.e. equal to the integral on the surface S of the scalar product of the wind curl and the directional surface normal.

A positive value of $C_\Gamma$, or a better trajectory Γnew, is obtained when the flow is positive.

Figure 5A:
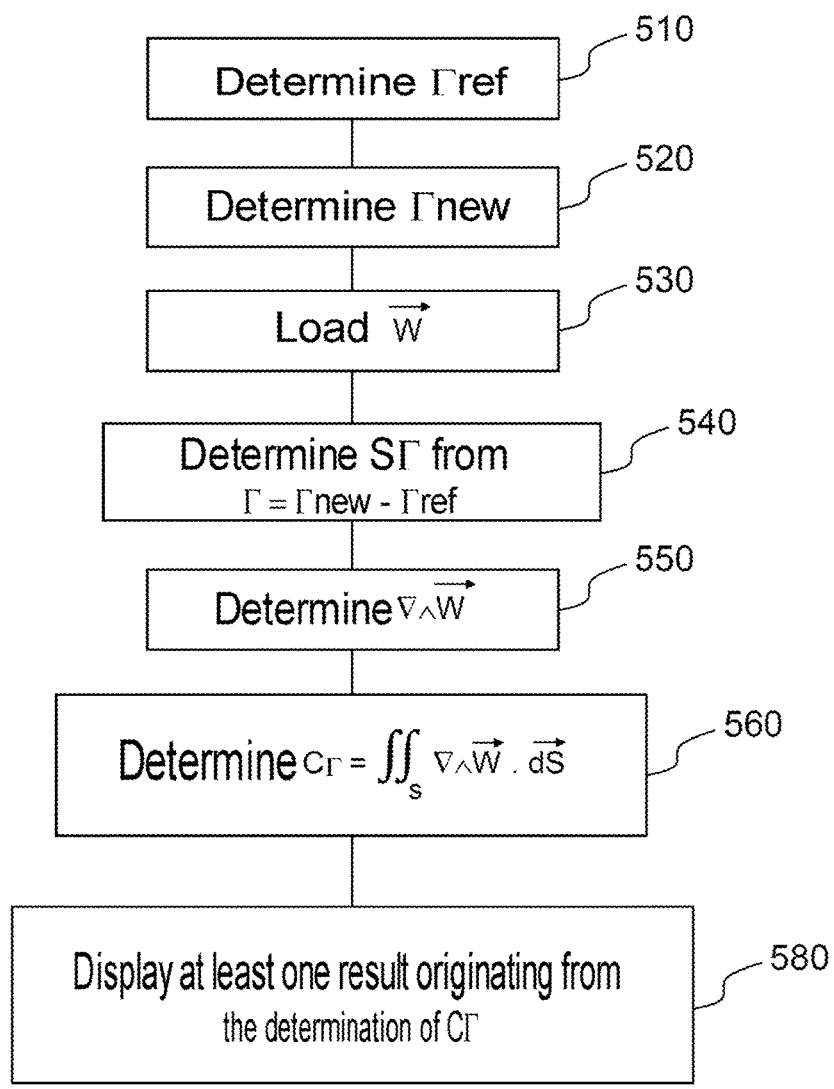
FIG. 5A shows the method according to the invention.

The method 500 according to the invention shown in FIG. 5A uses this concept developed by the inventors to compare two trajectories.

It includes a step 510 consisting in determining the reference trajectory Γref and a second step 520 consisting in determining the new trajectory Γnew.

In a third step 530, the method 500 loads meteorological data including the wind vector field W in a zone Z having predetermined dimensions including the reference trajectory and the new trajectory. These data are typically represented by a grid $M_W$ of wind vectors as described in the prior art, the projection of which in the plane xy is shown in FIG. 3.

In a step 540, the method furthermore determines the directional surface S, delimited by the directional closed curve Γ, made up of the new trajectory Γnew from the starting point A to the end point B closed by the opposite of the reference trajectory from the end point B to the starting point A.

A step 550 then consists in determining the wind vector curl, rot W, on the basis of the wind vector field W, for at least values of the wind vector located in the surface S.

This may involve a curl calculation for each wind vector of the grid $M_W$ and located inside the surface S. The integral is then calculated by discretising the calculation on the points of the grid.

The method may also optionally include in step 550 the determination of a grid of wind curls $M_C$ assigning, in each of the nodes of the grid, a wind curl (rot W) determined on the basis of the previously loaded wind vector field W. The shaping of the wind vector field in the form of a curl grid $M_C$ is advantageous for simplifying the flow calculation.

Finally, a step 560 determines the flow $C_\Gamma$ of the wind curl through the surface S. When the curls are known at the points of the grid $M_C$, the integral can then be calculated by discretising the calculation on these points.

And, according to the explanation above:

a positive value of the flow $C_\Gamma$ indicates that the new trajectory Γnew makes better use of the wind load than the reference trajectory Γnew, a negative value of the flow $C_\Gamma$ indicates that the new trajectory Γnew makes less effective use of the wind load than the reference trajectory Γnew.

A simple curl calculation, which can be performed on-board the aircraft since it does not involve a substantial amount of calculation, thus enables an immediate comparison of two trajectories between A and B.

The flow value is therefore a criterion for comparing two trajectories, the aim being to maximise this flow criterion.

As the wind changes over time, the wind vector field is updated regularly, and therefore the flow calculation is also preferably updated regularly.

The method preferably includes a step 580 of displaying at least one result originating from the determination of the flow of the wind curl through the surface S (directional surface, delimited by the directional closed curve Γ, made up of the new trajectory Γnew from the starting point A to the end point B closed by the opposite of the reference trajectory from the end point B to the starting point A).

According to one variant, the method includes a pilot interrogation step in order to determine whether or not the pilot wishes to insert the new trajectory into a temporary flight plan.

According to one variant, the display step 580 includes the display to the crew of the sign or the value of the flow calculated in step 560.

On the basis of this concept, it is possible to provide further aid to the crew on the display for an example of two trajectories located in the same horizontal plane xy. The preceding formulae can be broken down in the manner described below.

The scalar product of the wind curl and the surface vector dS correspond to the curl projection onto the axis z when the surface normal vector has the same direction as z (FIG. 4a):

$$C_\Gamma = \oint \vec{W} \cdot \vec{d\Gamma} = \iint_S \overrightarrow{\nabla \wedge W} \cdot \vec{dS} = +\iint_S (\nabla \wedge W)_z \cdot dS$$

Figure 4B:
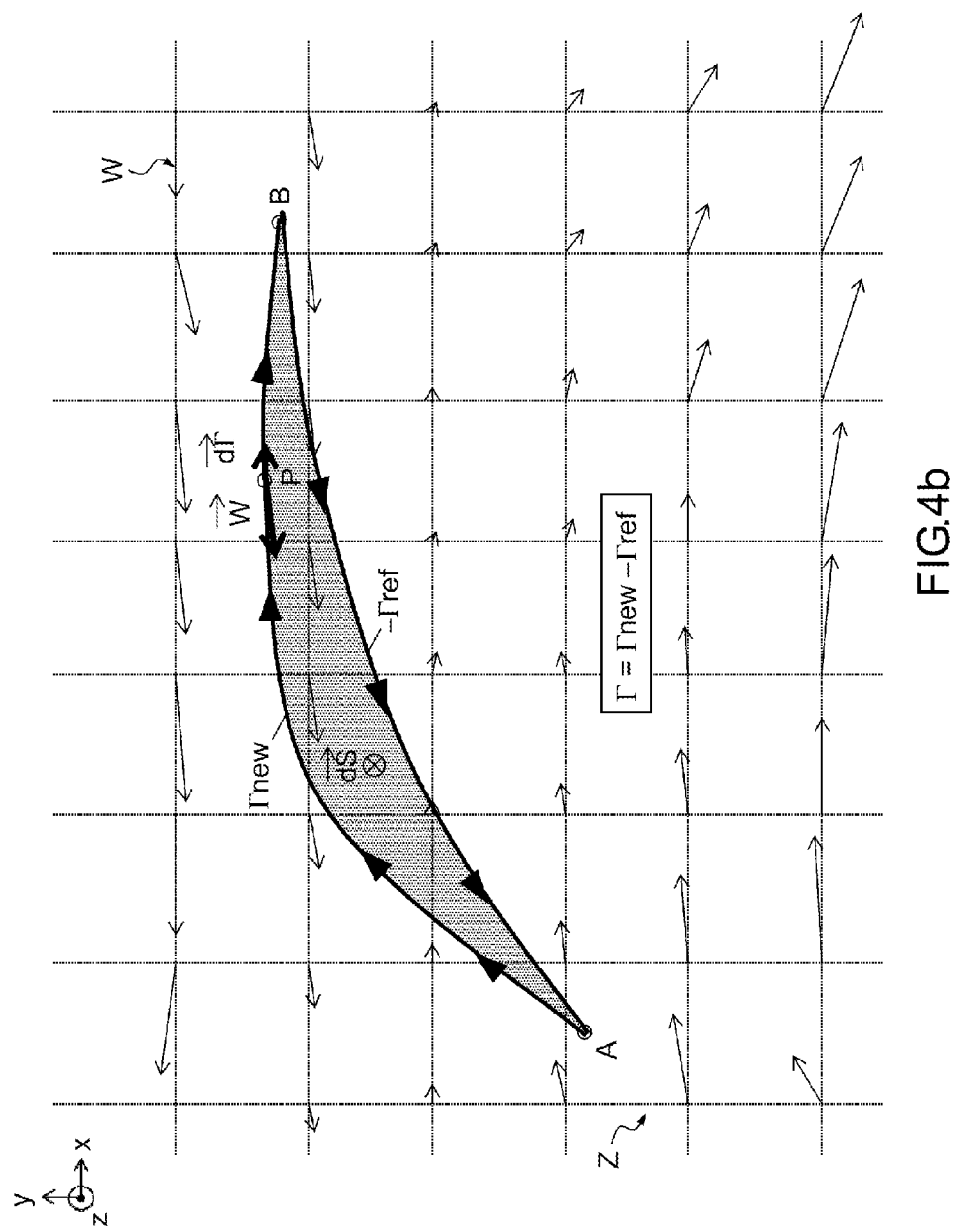

Conversely, the scalar product of the wind curl and the surface vector dS corresponds to the opposite of this projection when the surface normal vector has the opposite direction to z, as shown in FIG. 4b.

$$C_\Gamma = \oint \vec{W} \cdot \vec{d\Gamma} = \iint_S \overrightarrow{\nabla \wedge W} \cdot \vec{dS} = +\iint_S (\nabla \wedge W)_z \cdot dS$$

where $(\nabla \wedge W)_z$ is a component of the wind curl along the axis z.

Figure 6A:
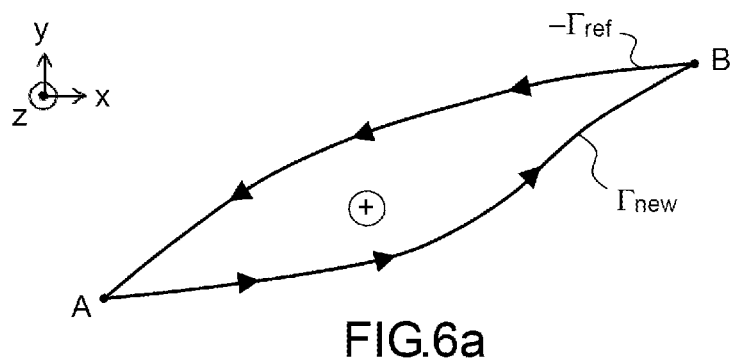
FIGS. 6a, 6b and 6c show the optimisation rule.

In the case shown in FIG. 4a, dS is in the same direction as z, and therefore a positive flow (a better trajectory Γnew) corresponds to a positive curl projection. This case is shown in FIG. 6a and the optimisation rule is expressed as follows:

When the reference trajectory Γref crosses a zone for which the component of the wind curl according to z $(\nabla \wedge W)_z$ is positive on the whole (integral on the surface), to improve it, it is appropriate to adopt a trajectory Γnew shifted to the right in relation to the reference trajectory from A to B.

Figure 6B:
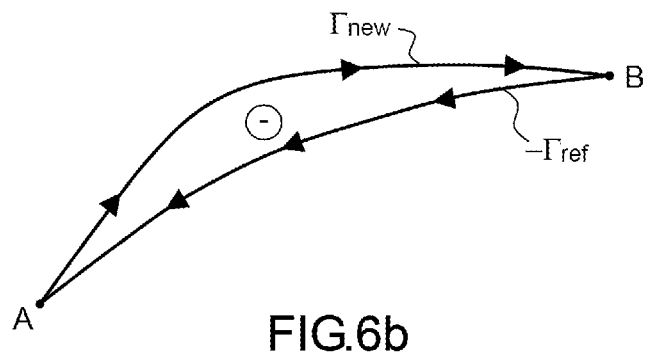

Conversely, in FIG. 4b, the vector dS is opposite to z, to have a positive flow value, it is appropriate to have a curl projection according to z that is negative, and a similar reasoning results in the optimisation rule shown in FIG. 6b:

When the reference trajectory Γref crosses a zone for which the wind curl component according to z $(\nabla \wedge W)_z$ is negative on the whole, in order to improve it, it is appropriate to adopt a trajectory Γnew shifted to the left in relation to the reference trajectory from A to B.

In other words, a zone having a positive wind curl projection integral on the axis z must be bypassed to the right, whereas a zone having a negative integral must be bypassed to the left.

Figure 6C:
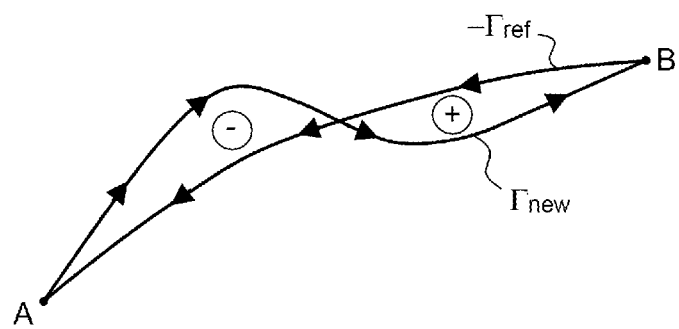

FIG. 6c shows the case where the wind vector field has a curl projection integral that is first negative then positive along the trajectory, resulting in a new improved trajectory that crosses the reference trajectory in the vicinity of the change of sign of the curl projection.

The sign of the wind curl projection according to the axis z indicates the direction in which it is appropriate to go in order to make best use of the wind load.

Figure 5B:
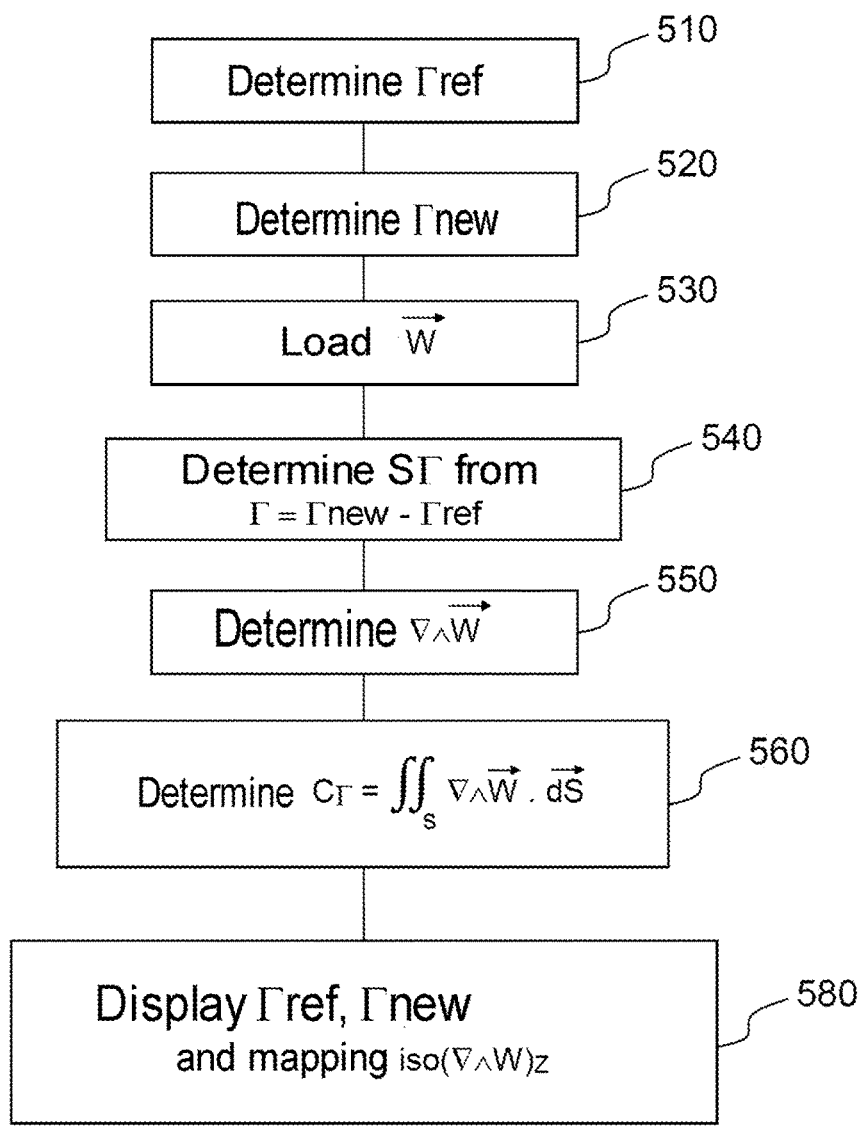
FIG. 5B is shows a variant of the method according to the invention.

According to one variant shown in FIG. 5B is, the display step 580 includes the display to the crew of a mapping of isovalues of the wind curl projection according to the axis z (z being defined in such a way that the reference xyz is orthonormal). This display is suitable when the trajectories to be compared are included in a given plane xy. The mapping is advantageously dependent on altitude and time (segmented into flight levels and timeframes), and a map exists for each level and for each time unit. Furthermore, the wind changes with time, so the mapping based on wind forecasts is updated periodically depending on the changes over time in meteorological conditions.

Figure 7:
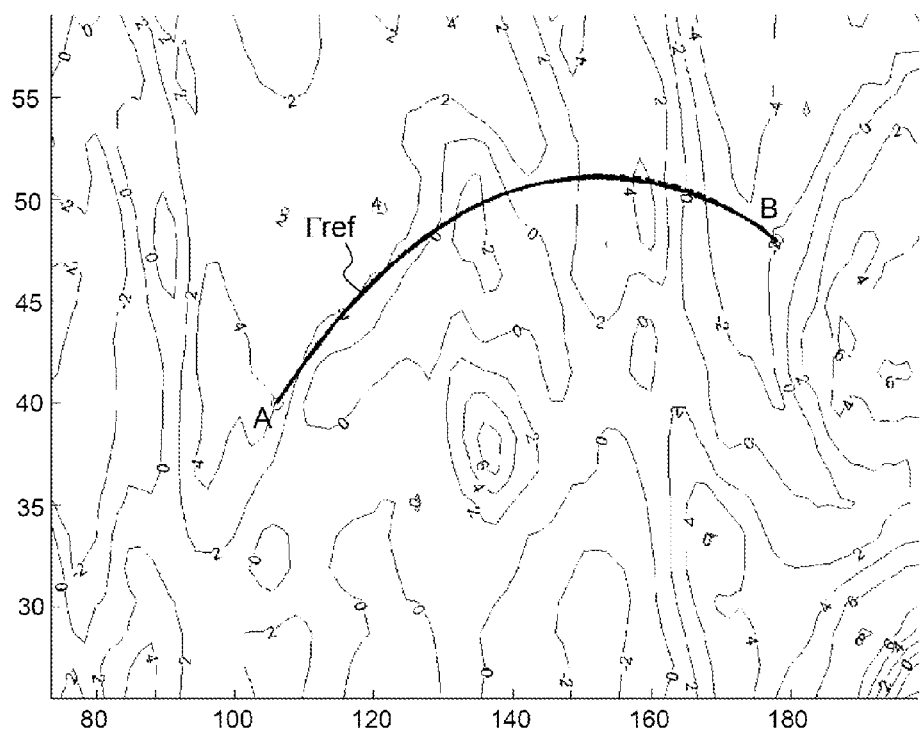
FIG. 7 shows the mapping superimposed on the display of the trajectories.

The mapping is preferably superimposed on the display of the trajectories, as shown in FIG. 7.

The mapping may, for example, be determined on the basis of the curl grid $M_C$ calculated on the basis of the wind grid $M_W$.

According to one preferred embodiment, the reference trajectory is the trajectory calculated by the FMS as described in the prior art, and advantageously the lateral trajectory.

According to one embodiment, the new trajectory is determined by the pilot, on the basis of the curl iso mapping shown in FIG. 7, i.e. the visual information that the pilot extracts from the mapping. The mapping zone can be chosen by the pilot or can be determined by the FMS.

Figure 8:
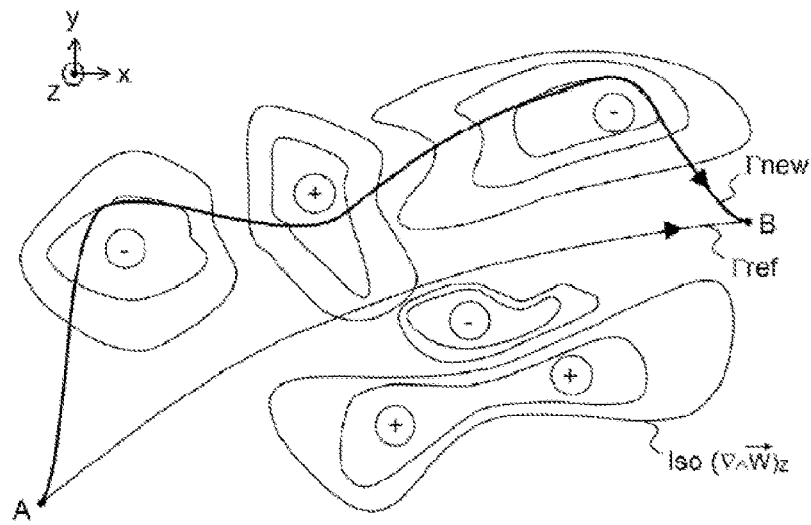
FIG. 8 shows a new trajectory applying the bypass rules, i.e. bypassing the positive zones to the right and the negative zones to the left.

The pilot, knowing the bypass rules explained above, himself establishes a new trajectory Γnew, on the basis of Γref and by bypassing the positive zones to the right and the negative zones to the left, as shown in FIG. 8. According to a first example, the pilot defines the new trajectory by inserting chosen control points. According to a second example, the pilot defines the new trajectory manually using a touch interface. The new trajectory Γnew advantageously consists in a deformation of the reference trajectory Γref, the deformation being performed graphically by the pilot by touch. The system advantageously displays the value of the corresponding flow in real time, so that the pilot can evaluate in real time the performance of the new trajectory in relation to the use of the wind.

According to a different embodiment, the step of determining the new trajectory Γnew is performed by the flight management system.

Figure 9:
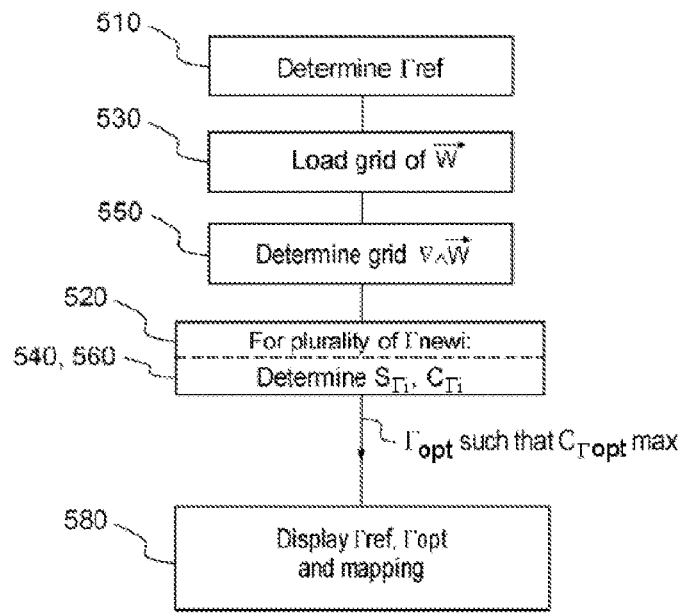
FIG. 9 shows a method enabling the determination of an optimum trajectory maximising the flow in a determined zone.

According to a first variant of this embodiment, shown in FIG. 9, the steps of determining a directional surface 540, and a curl flow 560 are carried out a plurality of times for a plurality of respective new trajectories Γnew$_i$. S$_{\Gamma i}$ and C$_{\Gamma i}$ are thus calculated for large number of trajectories Γnew$_i$.

Among the plurality of mutual directories new trajectories, an optimisation algorithm enables the determination of an optimum trajectory Γopt such that the associated flow C$_{\Gamma opt}$ is maximum.

A plurality of types of optimisation algorithm exist such as, for example algorithms based on the Bellman principle or algorithms based on systematic enumeration.

The zone in which the FMS calculates the optimum trajectory can be defined by the pilot, typically using mapping, or determined by the FMS.

Step 550 of the method shown in FIG. 9 consists in determining the wind curls for all the wind vectors of the grid $M_W$, thus generating a curl grid $M_C$. This calculation enables re-use of the wind curl grid $M_C$ in the event of an unforeseen change in the aircraft state. The pass in the form of a curl grid $M_C$ enables a preliminary processing and a possible compression of the wind data on the ground. This reduces the on-board computing load and reduces the volume of information to be uploaded to the aircraft.

Figure 10:
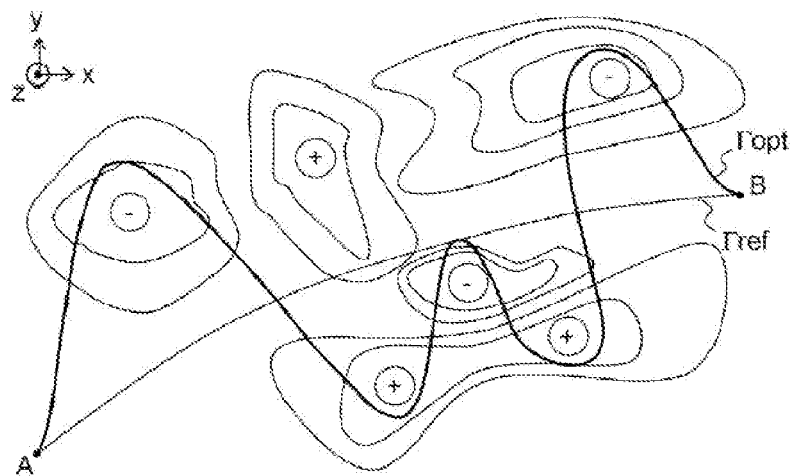
FIG. 10 shows an example of an optimum trajectory calculated with the method from FIG. 9.

One example of an optimum trajectory Γopt maximising the flow, calculated by an iterative algorithm, is shown in FIG. 10.

FIG. 10 shows that the trajectory Γopt calculated on the basis of the single flow criterion is relatively long compared with the reference trajectory.

In order to improve the optimisation, according to a second variant, a criterion enabling the trajectory length to be taken into account is introduced.

$D_{\Gamma ref}$ is taken as the length of the trajectory Γref and $D_{\Gamma new}$ as the length of the trajectory Γnew. $D_\Gamma$ is defined as the length difference between the two trajectories:

$$D_\Gamma = D_{\Gamma new} - D_{\Gamma ref} = \oint d\Gamma$$

Thus, according to this second variant, a compromise is achieved between a minimum length difference $D_\Gamma$ and a maximum flow $C_\Gamma$.

Figure 11:
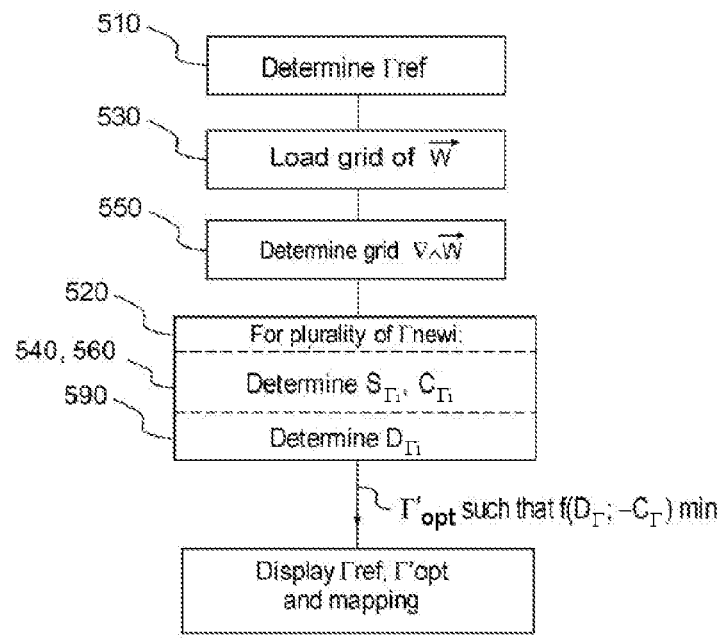
FIG. 11 shows a method enabling the determination of an optimum trajectory implementing a compromise between a maximum flow and a length difference with the minimum reference trajectory.

The method according to this second variant is shown in FIG. 11 and furthermore includes a step 590 of determining the length difference between the two trajectories $D_\Gamma$. The steps of determining a directional surface $S_\Gamma$, a curl flow $C_\Gamma$ and a length difference $D_\Gamma$ are carried out a plurality of times for a plurality of respective new trajectories Γnewi. The optimum trajectory T'opt is determined from the plurality of new trajectories in such a way that a parameter P representing a compromise between the length difference and the opposite of the flow is minimum, by means of an optimisation algorithm.

The parameter P is advantageously a positive-coefficient linear combination of said length difference and of the opposite of the flow:

$$P = a \cdot D_\Gamma - b \cdot S_\Gamma \quad a, b > 0$$

Figure 12:
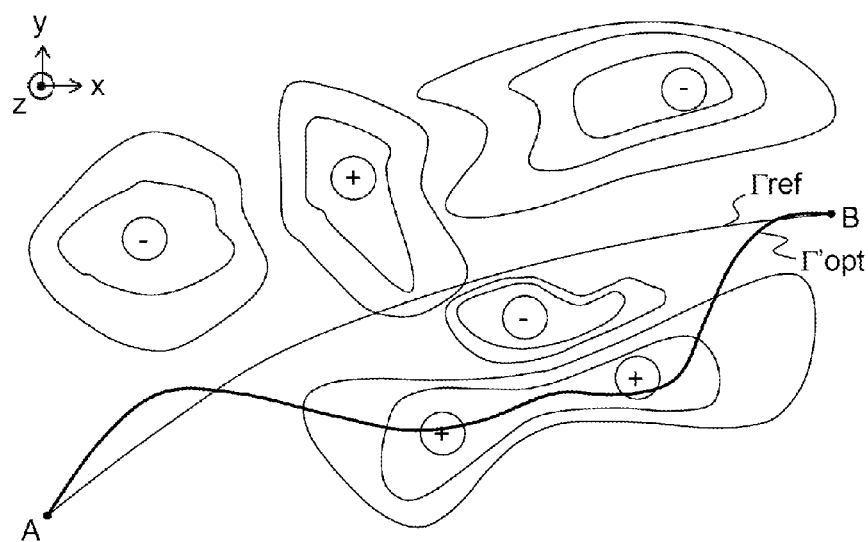
FIG. 12 shows an example of an optimum trajectory calculated with the method from FIG. 11.

An example of an optimum trajectory T'opt minimising a parameter P by means of an iterative optimisation algorithm is shown in FIG. 12.

The calculation of the optimum trajectory according to this last variant is particularly advantageous. It enables an optimised trajectory to be obtained quickly, making best use of the wind while not lengthening the trajectory too much, thus economising on time and fuel.

According to a different aspect, the invention relates to a flight management system including code instructions enabling the steps of the navigational aid method according to the invention to be carried out. This new function can be integrated into a flight management system to improve or optimise the trajectory during a flight.

According to a final aspect, the invention relates to a computer program product, the computer program including code instructions enabling the steps of the method according to the invention to be carried out.

The method can be implemented on the basis of hardware and/or software elements. The method can be available as a computer program product on a computer-readable medium.

The method can be implemented on a system that can use one or more dedicated electronic circuits or a general-purpose circuit.

The technology of the method according to the invention can be implemented on a reprogrammable computer (a processor or a microcontroller, for example) executing a program including a sequence of instructions, or on a dedicated computer (for example a logic gate array such as an FPGA or an ASIC, or any other hardware module.

The different modules of the system according to the invention can be implemented on the same processor or on the same circuit, or can be distributed among a plurality of processors or a plurality of circuits. The modules of the system according to the invention consist of computing means including a processor.

The reference to a computer program which, when it is executed, performs any one of the previously described functions, is not limited to an application program being run on a single host computer. On the contrary, the terms computer program and software are used here in a general sense to refer to any type of computer code (for example application software, microsoftware, microcode, or any other form of computer instruction) that can be used to program one or more processors to implement aspects of the technologies described here.

The invention claimed is:

1. A navigational aid method of an aircraft in flight, carried out by an on-board flight management system, for comparing a reference trajectory of the aircraft subjected to a wind vector field with a new trajectory of the aircraft, said reference trajectory and said new trajectory having an identical starting point and an identical end point, the method comprising:
    determining the reference trajectory by the flight management system, based at least on a flight plan, a navigational database, and a performance database containing aerodynamic and engine parameters of the aircraft,
    determining the new trajectory,
    loading meteorological data including the wind vector field in a zone having predetermined dimensions including the reference trajectory and the new trajectory, said wind vector field being based on wind forecasts in said zone,
    determining a directional surface, the directional surface being defined and delimited by a directional closed curve, the directional surface consisting of the new trajectory, from the starting point to the end point, closed by an opposite of the reference trajectory from the end point to the starting point,
    determining a wind curl on a basis of the wind vector field for at least wind vector values located in said directional surface,
    determining a flow of the wind curl through the directional surface, where:
    a positive value of said flow indicating that the new trajectory increases effective use of a wind load than the reference trajectory, and
    a negative value of said flow indicating that the new trajectory makes less effective use of the wind load than the reference trajectory, and
    displaying to a pilot of said aircraft at least one result originating from a preceding step consisting in determining a flow of the wind curl through the directional surface, and indicating which of two trajectories makes best use of the wind load.

2. The method according to claim 1, wherein the displaying step includes the display of one of the following: a sign or the value of the determined flow.

3. The method according to claim 1, wherein said reference trajectory and the new trajectory are contained in a plane xy and wherein the displaying step includes the display of a mapping of isovalues of a projection according to an axis z of the wind curl, z been defined in such a way that a reference xyz is orthonormal, said mapping being superimposed on the display of the trajectories.

4. The method according to claim 3, wherein the step of determining the new trajectory is performed by the pilot, the new trajectory been determined on a basis of visual information originating from said mapping.

5. The method according to claim 4, wherein the step of determining the new trajectory comprises a deformation of the reference trajectory performed graphically by the pilot, the system displaying the value of a corresponding flow in real time.

6. The method according to claim 1, wherein the step of determining the new trajectory is performed by the flight management system, and wherein the steps of determining a directional surface and a curl flow are carried out a plurality of times for a plurality of respective new trajectories, an optimum trajectory being determined from said plurality of new trajectories in such a way that said flow is maximum.

7. The method according to claim 1, wherein the step of determining the new trajectory is performed by the flight management system, said method further comprising a step of determining a length difference between the two trajectories, and wherein the steps of determining a directional surface, a curl flow and a length difference are carried out a plurality of times for a plurality of respective new trajectories, an optimum trajectory being determined from said plurality of new trajectories in such a way that a parameter representing a compromise between said length difference and the opposite of said flow is minimum.

8. The method according to claim 7, wherein said parameter is a positive-coefficient linear combination of said length difference and of the opposite of said flow.

9. A flight management system including code instructions enabling calculation of the steps of a navigational aid method of an aircraft in flight, carried out by the flight management system, for comparing a reference trajectory of the aircraft subjected to a wind vector field with a new trajectory of the aircraft, said reference trajectory and said new trajectory having an identical starting point and an identical end point, the flight management system comprising a processor configured for:
- determining the reference trajectory by the flight management system, based at least on a flight plan, a navigational database, and a performance database containing aerodynamic and engine parameters of the aircraft,
- determining the new trajectory,
- loading meteorological data including the wind vector field in a zone having predetermined dimensions including the reference trajectory and the new trajectory, said wind vector field being based on wind forecasts in said zone,
- determining a directional surface, the directional surface being defined and delimited by a directional closed curve, the directional surface consisting of the new trajectory, from the starting point to the end point, closed by an opposite of the reference trajectory from the end point to the starting point,
- determining a wind curl on a basis of the wind vector field for at least wind vector values located in said directional surface,
- determining a flow of the wind curl through the directional surface, where:
- a positive value of said flow indicating that the new trajectory increases effective use of a wind load than the reference trajectory, and
- a negative value of said flow indicating that the new trajectory makes less effective use of the wind load than the reference trajectory, and
- displaying to a pilot of said aircraft at least one result originating from a preceding step consisting in determining a flow of the wind curl through the directional surface, and indicating which of two trajectories makes best use of the wind load.

10. A non-transitory computer program product, said computer program storing code instructions to be executed by a flight management system, the code instructions implementing a navigational aid method of an aircraft in flight, carried out by the flight management system, for comparing a reference trajectory of the aircraft subjected to a wind vector field with a new trajectory of the aircraft, said reference trajectory and said new trajectory having an identical starting point and an identical end point, the code instructions comprising:
- determining the reference trajectory by the flight management system, based at least on a flight plan, a navigational database, and a performance database containing aerodynamic and engine parameters of the aircraft,
- determining the new trajectory,
- loading meteorological data including the wind vector field in a zone having predetermined dimensions including the reference trajectory and the new trajectory, said wind vector field being based on wind forecasts in said zone,
- determining a directional surface, the directional surface being defined and delimited by a directional closed curve, the directional surface consisting of the new trajectory, from the starting point to the end point, closed by an opposite of the reference trajectory from the end point to the starting point,
- determining a wind curl on a basis of the wind vector field for at least wind vector values located in said directional surface,
- determining a flow of the wind curl through the directional surface, where:
- a positive value of said flow indicating that the new trajectory increases effective use of a wind load than the reference trajectory, and
- a negative value of said flow indicating that the new trajectory makes less effective use of the wind load than the reference trajectory, and
- displaying to a pilot of said aircraft at least one result originating from a preceding step consisting in determining a flow of the wind curl through the directional surface, and indicating which of two trajectories makes best use of the wind load.

* * * * *